United States Patent
Hardisty et al.

(10) Patent No.: US 12,487,738 B1
(45) Date of Patent: Dec. 2, 2025

(54) PLATFORM FOR CONSTRUCTING CUSTOM MODELS

(71) Applicant: BLACKROCK FINANCE, INC., New York, NY (US)

(72) Inventors: Michael Hardisty, San Francisco, CA (US); Suzanne Ly, San Francisco, CA (US); Troy Wu, Belmont, CA (US); Venu Jadcherla, Fremont, CA (US); Namratha Peddi, New York, NY (US); Bryan Xian, Boston, MA (US); Peter Huddleston, Hong Kong (HK)

(73) Assignee: BlackRock Finance, Inc., New York, NY (US)

( * ) Notice: Subject to any disclaimer, the term of this patent is extended or adjusted under 35 U.S.C. 154(b) by 0 days.

(21) Appl. No.: 18/299,336

(22) Filed: Apr. 12, 2023

(51) Int. Cl.
G06F 3/0482 (2013.01)
G06F 3/04847 (2022.01)

(52) U.S. Cl.
CPC ........ G06F 3/04847 (2013.01); G06F 3/0482 (2013.01)

(58) Field of Classification Search
CPC .............................. G06F 3/04847; G06F 3/0482
See application file for complete search history.

(56) References Cited

U.S. PATENT DOCUMENTS

| | | | | |
|---|---|---|---|---|
| 8,386,360 B2* | 2/2013 | Abidi | ............ | G06Q 40/06 705/37 |
| 10,915,960 B1* | 2/2021 | Johnson | ............ | G06T 11/206 |
| 11,620,541 B1* | 4/2023 | Ghosh | ............ | G06N 5/04 707/600 |
| 2008/0243716 A1 | 10/2008 | Ouimet et al. | | |
| 2010/0070433 A1* | 3/2010 | Jeng | ............ | G06Q 40/06 705/36 R |
| 2012/0116990 A1* | 5/2012 | Huang | ............ | G06Q 40/06 705/36 R |
| 2014/0143175 A1* | 5/2014 | Greenshields | ............ | G06Q 40/06 705/36 R |
| 2019/0340524 A1* | 11/2019 | Kirchhoff | ............ | G06N 5/043 |
| 2021/0264521 A1 | 8/2021 | Lee et al. | | |

FOREIGN PATENT DOCUMENTS

KR 101783092 B1 9/2017

OTHER PUBLICATIONS

Alam, "Comparing Portfolio Performance to a Benchmark: Risk and Attribution Analyses." ResearchGate. Oct. 9, 2021. 10.13140/RG.2.2.13826.40642. Retrieved from the Internet on Nov. 1, 2023. Retrieved from https://www.researchgate.net publication/356186192_Comparing_Portfolio_Performance_to_a_Benchmark_Risk_and_Attribution_Analyses.

* cited by examiner

*Primary Examiner* — KC Chen
(74) *Attorney, Agent, or Firm* — Haynes and Boone, LLP

(57) ABSTRACT

A system, method, and a computer program product for generating custom models are provided. A custom model platform includes a user interface that receives selections for model criteria, including a platform model group, a risk profile, a sequence of transformations, and a sequence of constraints. A platform model is retrieved based on the platform model group and the risk profile. The platform model is transformed into a custom model using the sequence of transformations. The custom model is constrained using the sequence of constraints. The custom model and the platform model are displayed on the user interface.

20 Claims, 7 Drawing Sheets

| Hypothetical Model | Conservative (20/80) | | Moderate Conservative (40/60) | | Moderate Growth (60/40) | | Growth (80/20) | |
|---|---|---|---|---|---|---|---|---|
| | Platform | Custom | Platform | Custom | Platform | Custom | Platform | Custom |
| U.S. Equity | 18% | 17% | 31% | 32% | 50% | 49% | 60% | 62% |
| U.S. Large Cap Fund (Manager 1) | | 8% | | 13% | | 18% | | 21% |
| iShares Core S&P 500 ETF | 5% | 5% | 10% | 8% | 20% | 11% | 15% | 15% |
| BlackRock Technology Opportunities Fund | | | 3% | 3% | 5% | 5% | 20% | 6% |
| iShares Edge MSCI Minimum Volatility USA Factor ETF | 4% | 4% | 5% | 5% | 15% | 6% | 15% | 8% |
| iShares Edge MSCI USA Quality Factor ETF | 5% | | 5% | 5% | 5% | 5% | 5% | 7% |
| iShares Edge MSCI USA Momentum Factor ETF | | | | 3% | 5% | 4% | 5% | 5% |
| International Equity | 2% | 4% | 8% | 9% | 10% | 12% | 19% | 19% |
| EAFE Developed Fund (Manager 2) | | 2% | | 4% | | 6% | | 10% |
| iShares Core MSCI EAFE ETF | 2% | 2% | 8% | 3% | 10% | 3% | 19% | 4% |
| Emerging Markets Fund (Manager 3) | | | | 2% | | 3% | | 5% |
| U.S. Fixed Income | 71% | 71% | 54% | 54% | 36% | 36% | 21% | 19% |
| BlackRock Total Return Bond Fund | 23% | 20% | 24% | 18% | 13% | 13% | 10% | 9% |
| iShares Core U.S. Aggregate Bond ETF | 24% | 17% | 20% | 11% | 20% | 8% | 5% | 4% |
| U.S. Income Fund (Manager 4) | | 19% | | 15% | | 12% | | 6% |
| iShares MBS ETF | 24% | 6% | 10% | 4% | 3% | 3% | 6% | |
| U.S. Floating Rate Fund (Manager 5) | | 8% | | 6% | | | | |
| International Fixed Income | 9% | 8% | 7% | 5% | 4% | 3% | | |
| iShares JP Morgan USD Emerging Market Bond ETF | 9% | 8% | 7% | 5% | 4% | 3% | | |

FIG. 3

PLATFORM FOR CONSTRUCTING CUSTOM MODELS

TECHNICAL FIELD

The embodiments are directed to data customization, and more specifically to constructing custom models based on customized model criteria.

BACKGROUND

A platform may receive data from various data sources and generate models based on the data. The models, however, are not based on customized data that is specific to individual users or based on model criteria that has been created by the users.

BRIEF DESCRIPTION OF THE DRAWINGS

FIG. 3 is a diagram of a user interface displaying platform and custom models, according to some embodiments.

In the figures, elements having the same designations have the same or similar functions.

DETAILED DESCRIPTION

The embodiments are directed to a custom model platform that generates custom models. To generate custom models, the custom model platform generates and displays a user interface. The interface receives custom model criteria that may include platform model groups that serve as basis for generating custom models, risk profiles, one or more transformations configured with custom data to generate custom models, and one or more custom model constraints.

Once the custom model platform receives the custom model criteria, the custom model platform may use the custom model criteria to select the platform model groups and platform models within the platform model groups that server as basis for the custom models. Custom model platform may then perform a sequence of transformations that are selected and configured in the user interface to generate custom models. Each transformation in the sequence of transformations may be mapped to a transformation function written in a software programming language. The input to the transformation function may be a model, such as a platform model, and model criteria, and the output of the transformation function may be the model transformed by the transformation function. Further, the output of one transformation function may be an input to the subsequent transformation function in the sequence of transformations until the custom model is generated. In some instances, the behavior of the custom model may also be adjusted or constrained as specified by the custom model constraints.

Once the custom models are generated, the custom model platform may display the custom models using a user interface. In some instances, the custom models may be displayed next to the corresponding platform models from which the custom models were generated.

As used herein, the term "module" or "platform" may comprise hardware or software-based framework that performs one or more functions.

Figure 1:
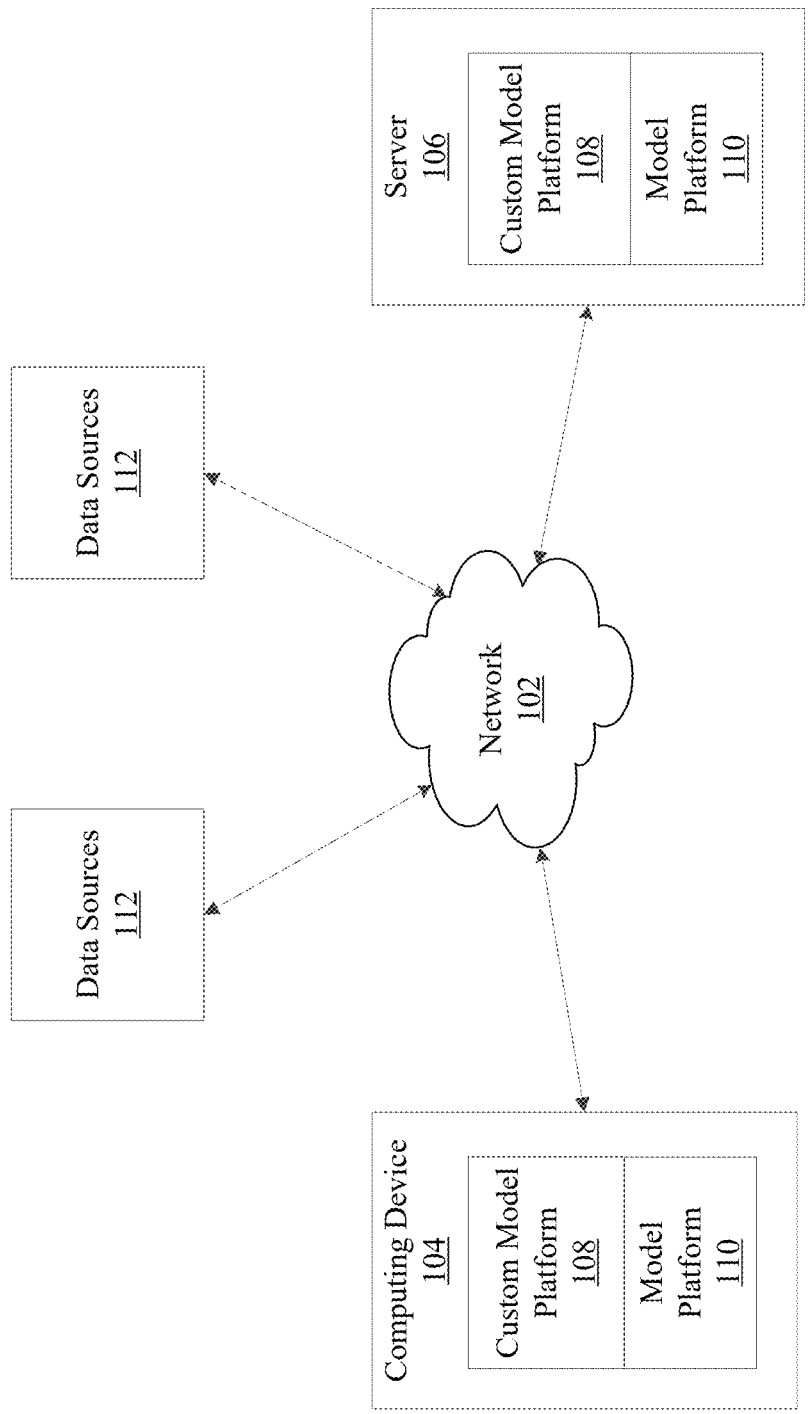
FIG. 1 is a simplified diagram of a computing environment where the custom model platform may be implemented, according to some embodiments.

FIG. 1 is an exemplary system 100 where a custom model platform may be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network. Network 102 may be accessible by various components of system 100.

System 100 also includes one or more computing devices 104 and servers 106, although only one of each is shown in FIG. 1. Computing devices 104 may be portable and non-portable electronic devices under control of a user and configured to transmit, receive, manipulate data, execute various applications, and communicate with other devices connected to network 102. Example computing devices 104 may be desktop computers, laptop computers, tablets, smartphones, wearable computing devices, eyeglasses that incorporate computing devices, implantable computing devices, etc.

In some embodiments, network 102 may also include servers 106. Servers 106 may be computer software programs or hardware devices that allow computing devices 104 to access centralized applications, provide processing capabilities and facilitate distribution of data throughout network 102.

Computing devices 104 and servers 106 may store and execute a custom model platform 108 and model platform 110. Custom model platform 108 and model platform 110 may be implemented in software and/or hardware that has sequential and parallel processing capabilities. Custom model platform 108 and model platform 110 may receive data from various data sources 112 connected to network 102. Model platform 110 may generate platform models. In some instances, custom model platform 108 may also be configured to receive custom data that is configured by users of computing devices 104. This custom data may not be available to model platform 110. As such, model platform 110 may generate platform models based on data from various data sources 112. Custom model platform 108 may access platform models generated by model platform 110 and transform the platform models into custom models using the custom data, such as model criteria, and a sequence of transformation. Each transformation in the sequence of transformations may be activated by the custom model platform 108. To be activated, the transformation may be selected from multiple transformations using model criteria selections displayed on a user interface of custom model platform 108 or through a configuration file. The transformation may also be configured using custom data. In some embodiments, custom model platform 108 may be integrated into model platform 110 as a software plug-in, a script, or the like.

In some embodiments, custom model platform 108 and model platform 110 may execute on one or more computing devices 104 or servers 106. In other embodiments, custom model platform 108 and model platform 110 may also execute in part on one or more computing devices 104 and in part on one or more servers 106. In some instances, a user interface portion of custom model platform 108 and model platform 110 that displays the models may execute on the computing device 104 and an analytics portion that generates the models may execute on the server 106. Custom model platform 108 and model platform 110 with different components or modules executing on computing device 104 and server 106 may include a communication interface for receiving and transmitting data among the components or modules.

Data sources 112 may be sources of data that model platform 110 may use to generate platform models. The data may be transaction data, medical data, health data, computer network data, sensor data, maintenance data, trading data, and the like. The data may be generally associated with the data source 112 that generates and/or processes the data. A data source 112 may also generate or provide data that includes various assets, including securities, funds, electronically traded funds (ETFs), bonds, and the like. The platform model 110 may generate platform models based on any type of data.

Custom model platform 108 may generate custom models. The custom models may be a combination of platform models and custom data. As discussed above, platform models may be models that are generated by model platform 110 based on data from data sources 112. Custom models may be models that include custom data or user specific data that maybe received as input and is overlaid with data from platform models. The custom data or user specific data may not be available to data sources 112 and may not be considered by model platform 110 when generating platform models. Custom data may be data that may be received from users, including model criteria, that may be used to change, supplement and/or customize behavior of the platform models.

In some embodiments, model platform 110 may generate platform models based on input data and data sources 112. Platform models may be configured to model a portfolio of assets and potential income from the assets over a predefined time period. The input data may be data associated with a user or a client that provides funds for a portfolio. Typically, model platform 110 may receive input data when a new user or client is associated with a user account within model platform 110. The input data may be adjusted at various times or upon demand. Example input data may include assets or asset groups to be included in the model platform 110 and other preferences. Model platform 110 then applies input data to the data from data sources 112 to generate platform models.

In some embodiments, custom model platform 108 may generate custom models based on a combination of input data, platform models, and custom model criteria. Custom model platform 108 may provide a user interface for selecting the custom model criteria for generating custom models as well as customizing the model criteria. The user interface may be displayed on computing device 104.

Figure 2:
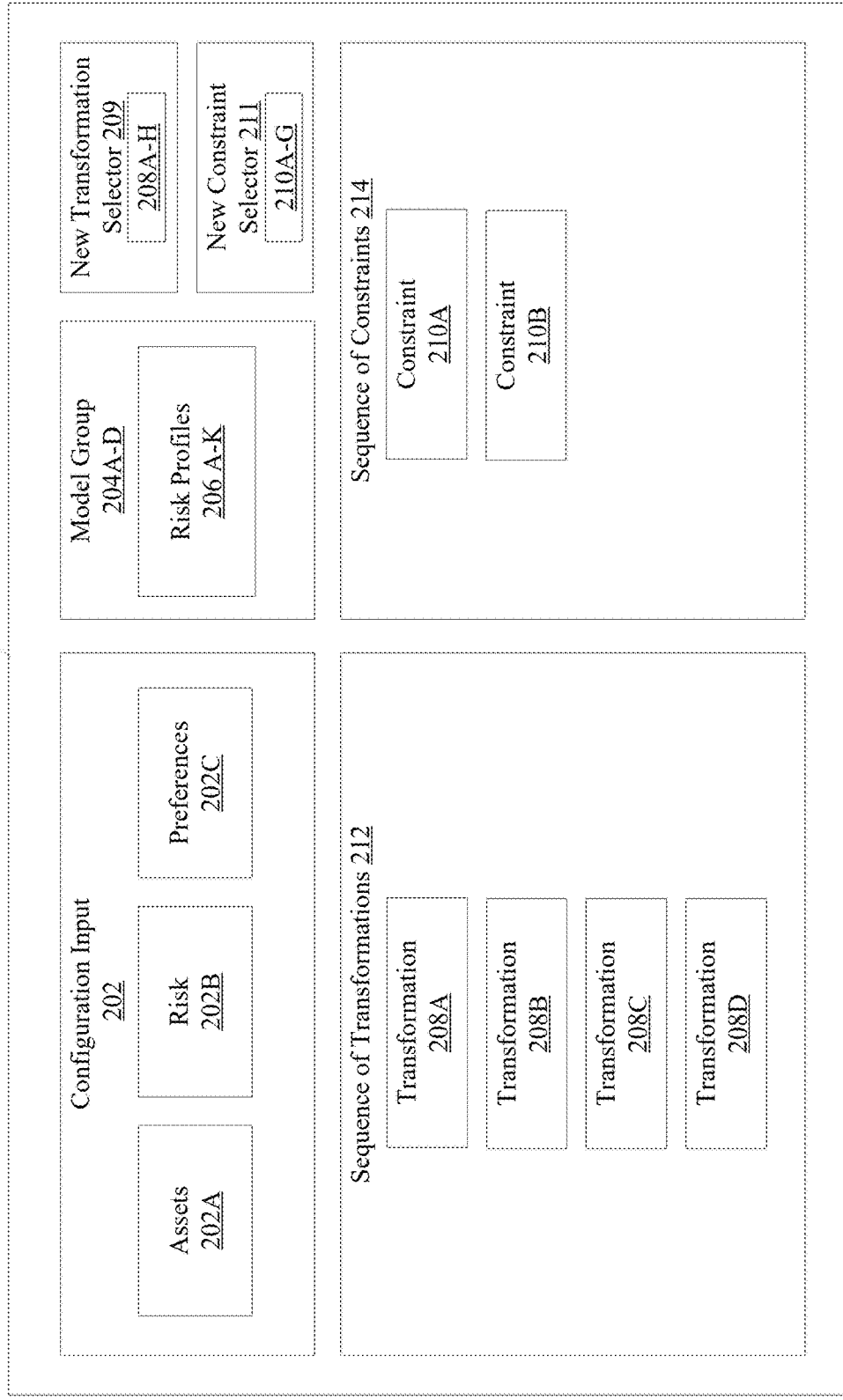
FIG. 2 is a diagram of a user interface for selecting custom model criteria, according to some embodiments.

FIG. 2 is a block diagram 200 of a user interface for selecting custom model criteria, according to some embodiments. FIG. 2 displays a user interface 201 that includes configuration input 202 and model criteria options that may be selected to generate custom model(s). Configuration input 202 may be associated with a user that may be assigned an account with custom model platform 108. Configuration input 202 may include assets 202A, risk 202B, and preferences 202C discussed above. Assets 202A may be assets selected for inclusion into the platform models. Risk 202B may be a risk associated with a custom model. Preferences 202C may be customized preferences associated with the user associated with the portfolio. Some example preferences may be maintaining a predefined percentage of a portfolio modeled by a custom model as cash, maintaining a predefined minimum position in an asset, maintaining a predefined maximum percentage of a portfolio in certain types of assets, setting a predefined minimum trade amount of an asset, and the like.

The model criteria may be customized criteria that custom model platform 108 may use to generate custom model(s). The custom model may be used to model a behavior of a portfolio of assets. The model criteria may include platform model groups 204. Platform model groups 204 may correspond to a target behavior of the custom model. There may be different types of platform model groups where each group has a different target behavior. For example, platform model group 204A may be an allocation taxable target group, platform model group 204B may be an allocation tax away target group, platform model group 204C may be an allocation smart beta target group, and platform model group 204D may be an allocation ESG (Environment, Social, Governance) target group. There may be other platform model groups 204 that are not discussed above and which may be added to user interface 201. The user interface 201 may receive input that selects one or more of the platform model groups 204A-D. The selected platform model groups may serve as basis for generating custom models.

In some embodiments, each platform model group 204 may be associated with one or more risk profiles 206. The number of risk profiles 206 may be specific to each platform model group. For example, suppose platform model group 204A is selected. The selected platform model group 204A may correspond to eleven different risk profiles, shown as risk profiles 206A-K. The risk profiles 206A-K may be displayed after platform model group 204A is selected. Each risk profile 206A-K may be associated with a high risk-low risk level pair, which may translate to risk tolerance of the custom model. The high risk and low risk may be modeled using a combination of high risk and low risk assets. Example risk profiles in risk profiles 206A-K may be zero-one hundred risk level pair 206A, ten-ninety risk level pair 206B, twenty-eighty risk level pair 206C, thirty-seventy risk level pair 206D, forty-sixty risk level pair 206E, fifty-fifty risk level pair 206F, sixty-forty risk level pair 206G, seventy-thirty risk level pair 206H, eighty-twenty risk level pair 206I, ninety-ten risk level pair 206J, and one hundred-zero risk level pair 206K. The combination of the high risk and low risk levels in each pair may correspond to a conservative, moderate, moderate-growth, growth, and the like risk tolerance of the custom model that simulates a portfolio. The user interface 201 may receive input that selects one or more of the risk profiles 206A-K that correspond to the selected model group 204A. As will be discussed below, custom model platform 108 may generate a custom model for each selected risk profile 206. In another example, suppose platform model group 204B is selected. Platform model group 204B may correspond to five risk profiles that may include zero-one hundred risk level pair, twenty-five-seventy-five risk level pair, fifty-fifty level pair, seventy-five-twenty-five risk level pair, and one hundred-zero risk level pair (not shown).

In some embodiments, model criteria may include transformations 208. User interface 201 may receive an input that may instantiate and configure transformations 208, such as exemplary transformations 208A-H. Transformations 208 may be instantiated in a configurable sequence. Different transformations 208 may be inserted at any point in the transformation sequence. Further transformations 208A-H may have different types. Transformations 208 selected into the sequence of transformations may specify model criteria that transforms a platform model generated using model platform 110 into a custom model generated using custom model platform 108. Further, transformations 208 may include one or more parameters that may be set using user interface 201. Some of the parameters may also be set based on various preferences 202C.

In one embodiment, transformation 208A may copy an asset or a group of assets from platform model to custom model. The asset or the group of assets may be configured in transformation 208A using a ticker or another parameter specific to the asset or the group of assets via user interface 201. Example assets may be stocks, bond, funds, ETFs, and the like. The asset or the group of assets specified in transformation 208A may not be substituted with other assets or groups of assets. In another embodiment, transformation 208B may substitute one group of assets with another group of assets. For example, a group of assets that may be specified in assets 202A in configuration input 202 and may be included in a platform model may be replaced with another group of assets specified by transformation 208B. The groups of assets may be configured using various parameters, such as a ticker(s) or another parameter(s) using the user interface 201. In another embodiment, transformation 208C may substitute an asset with another asset. For example, an asset specified in assets 202A in configuration input 202 may be replaced with another asset specified in transformation 208C via user interface 201. The asset may be configured using various parameters, such as a ticker, asset name, or another parameter. In another example, transformation 208D may configure how the asset allocations are rounded. For example, transformation 208D may be used to specify that asset allocations should be rounded to the nearest integer, percentage, and the like. The rounding criteria may be specified using user interface 201. In another example, transformation 208E may specify a maximum percentage or maximum allocation of an asset that may be included in the custom model. The maximum percentage or maximum allocation may be specified using user interface 201. In another example, transformation 208F may specify a maximum percentage of certain types of assets that may be included in the custom model. The maximum percentage may be specified using user interface 201.

To select transformations 208A-H into the sequence of transformations 212, user interface 201 may include a new transformation selector 209. New transformation selector 209 may be a button, a field, or a tab. The new transformation selector 209, when selected, may provide a selectable list of available transformation 208A-H. Once a transformation is selected, the selected transformation may be added to the sequence of transformations 212 that may be used to generate custom model. For example, user interface 201 includes a sequence of transformations 212 that includes transformations 208A-D. Transformations 208 may be added to sequence of transformations 212 and removed from the sequence of transformations 212 at various points in the sequence 212.

In some embodiments, transformations 208A-H may repeat in the sequence of transformations 212. That is, there may be multiple transformations 208A-H of the same type in the sequence of transformations 212 (not shown). For example, new transformation selector 209 may be used to instantiate transformation 208A and 208B twice (or other number of times), where the second transformation 208A may be configured to substitute a second asset and the second transformation 208B may be configured to substitute a different group of assets.

In some embodiments, model criteria may include one or more constraints 210, such as constraints 210A-H. Constraints 210A-H may indicate preferences associated with custom model behavior. In a non-limiting embodiment, constraints 210 may include an active constraint 210A, a factor constraint 210B, an index constraint 210C, an alternatives constraint 210D, a rounding constraint 210E, a minimum trade size constraint 210F, and a cash constraint 210G. Active constraint 210A may indicate a preference that the custom model may generate an active portfolio that may focus on outperforming the market. Factor constraint 210B may indicate a preference for a custom model that generates a portfolio that uses factors, such as stocks, bonds, securities, etc., that are known to have high returns or other preferred characteristics. Index constraint 210C may indicate a preference for a custom model that generates a portfolio with a performance that tracks an index. An alternatives constraint 210D may indicate a preference for a custom model that generates a portfolio with a predefined percentage of alternative investments. The rounding constraint 210E may round the shares of the assets that are traded to a nearest whole number. The minimum trade size constraint 210F may set the minimum trade size of shares of the assets in the portfolio generated by the custom model. The cash constraint 210G may set the maximum amount of cash that may remain uninvested in the portfolio generated by the custom model. The asset constraint 210H may set the minimum percentage of an asset to be included in the portfolio generated by the custom model. There may be other constraints 210 that are not discussed above that may be added to user interface 201. Further, constraints 210 may include one or more parameters that may be set using user interface 201. Some of the parameters may also be set based on various preferences 202C.

User interface 201 may receive an input that may instantiate constraints 210A-H into a sequence of constraints 214. The input may also configure each constraint 210A-H in the sequence 214. For example purposes only, user interface 201 includes sequence of constraints with constraints 210A-B.

To instantiate a new constraint in the sequence of constraints 214, user interface 201 may include a new constraint selector 211. The new constraint selector 211 may be a button, a field, or a tab. The new constraint selector 211, when selected, may provide a selectable list of available constraints, such as constraints 210A-H discussed above. Once a constraint is selected, the selected constraint may be added to the sequence of constraints 210 and may be configured using user interface 201.

In some embodiments, a combination of transformations 208 and constraints 210 may be used to configure customized preferences to generate custom models via user interface 201. One example of a customized preference may be to model a preference 202C that is "hold 3% cash." To configure this preference, transformation 208C may be configured to transform an asset to cash with a limit that is 3%. Next, constraint 210G may be used to enforce the 3% constraint. In another example, a preference 202C may be to maintain an 18% minimum position in an asset for a risk profile greater than sixty-forty risk level pair. To configure this preference, transformation 208A may be configured to maintain an asset at above 18% of the total assets in the portfolio for risk levels that are higher than the sixty-forty risk level pair. Next, asset constraint 210H may be used to enforce the minimum 18% constraint for an asset. In another example, preference 202C may be to include no more than 70% of assets in a portfolio that are associated with a particular factor. To configure this preference, transformation 208B may be used to substitute a group of assets associated with the factor with another group of assets that are not associated with the factor when the group of assets exceeds 70%. Next, factor constraint 210B may be configured to enforce that the group of assets comprises less than 70% of the portfolio. Notably, the above examples of the customized preferences are exemplary, and various other combinations of the transformations 208 and/or constraints 210 may be used to configure other types of preferences for portfolios that are modeled using custom models.

Once the model criteria is selected, custom model platform 108 may generate custom models, as will be discussed in further detail below.

FIG. 3 is a diagram 300 of a user interface displaying platform models and custom models, according to some embodiments. A user interface 302 in FIG. 3 includes platform models 304A-D and custom models 306A-D. Custom model platform 108 may upload platform models 304A-D from a memory storage and display platform models 304A-D using user interface 302. Custom model platform 108 may also use platform models 304A-D to generate custom models 306A-D by applying sequence of transformations 212 and sequence of constraints 214 to platform models 304A-D. Custom model platform 108 may display custom models 306A-D next to the corresponding platform models 304A-D that serve as basis for the custom models 306A-D. As illustrated in FIG. 3, platform models 304A-D and custom models 306A-D may include assets 307 allocated by different percentages or proportions. Example assets 307 may be various funds, ETF, and the like in various asset groups, such as U.S. Equity, International Equity, U.S. Fixed Income, and International Fixed Income.

Platform models 304A-D and custom models 306A-D displayed in FIG. 3 may correspond the model criteria selected using user interface 201. For example, platform models 304A-D and custom models 306A-D may correspond to the allocation taxable target group 204A that may have been selected using user interface 201. Platform models 304A-D and custom models 306A-D may also have risk profiles selected from risk profiles 206A-K, such as twenty-eighty risk level pair 206C, forty-sixty risk level pair 206E, sixty-forty risk level pair 206G, and eighty-twenty risk level pair 206I.

As will be discussed in more detail below, custom model platform 108 may use the selections in model group 204A-D and risk profiles 206A-K to retrieve platform models 304A-D. Custom model platform 108 may then apply the sequence of transformations 212 to platform models 304A-D to generate custom models 306A-D. For example, suppose sequence of transformations 212 included four transformations 208B which added assets 310A-D to platform models 304A-D to generate custom models 306A-D. As illustrated in FIG. 3, custom models 306A-D include one or more of assets 310A-D, which are not included in platform models 304A-D.

Custom model platform 108 may also apply the sequence of constraints 214 to the custom models. For example, as illustrated in FIG. 2, active constraint 210A and factors constraint 210B may be instantiated using new constraint selector 211 into the sequence of constraints 214. Once instantiated, custom model platform 108 may apply active and factors constraints 210A and 210B to custom models 306A-D. The active and factors constraints 210A and 210B may constrain custom models 306A-D to be managed as "active" portfolios and that have preferences for investments associated with the predefined "factors."

Figure 4:
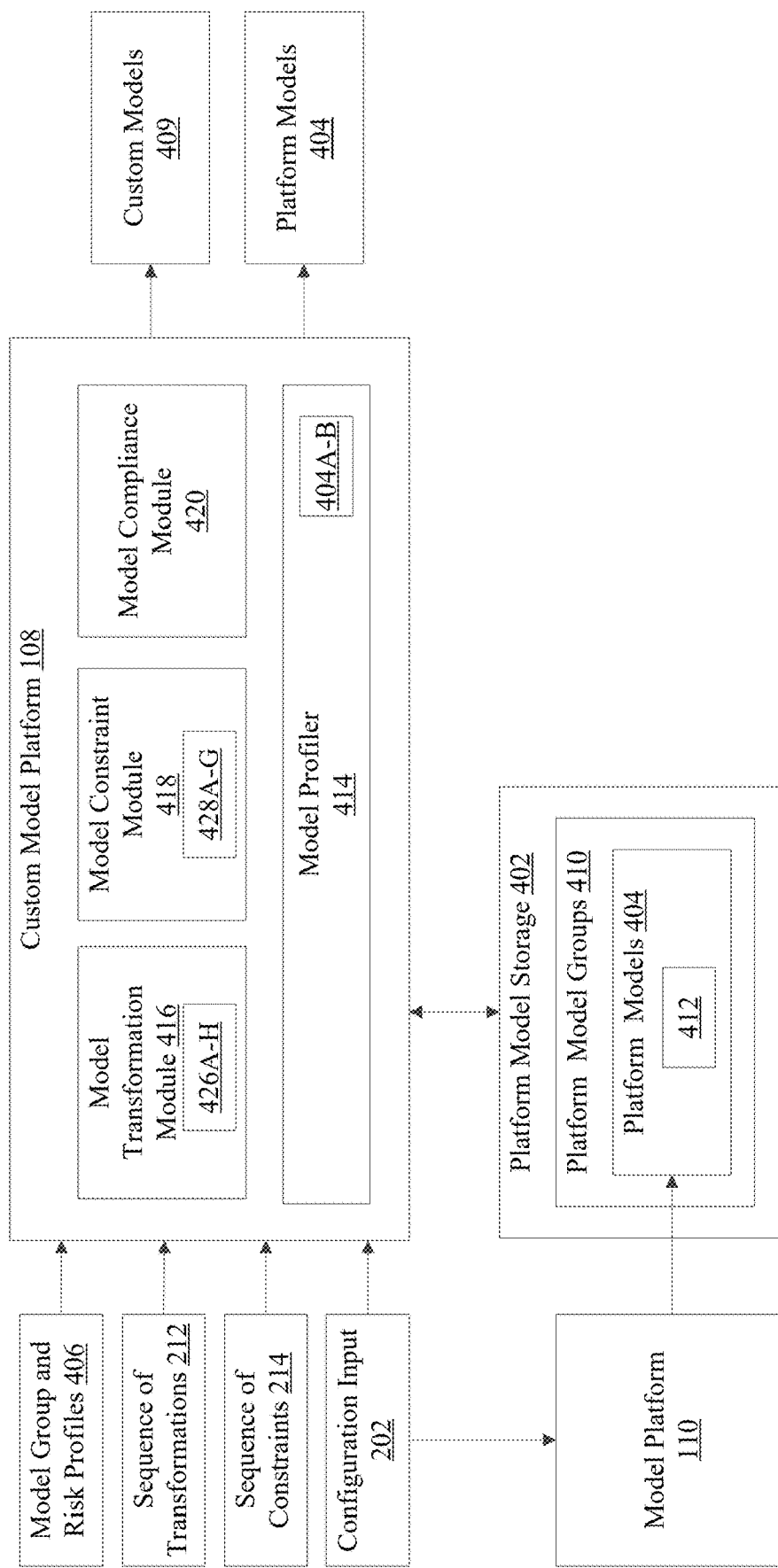
FIG. 4 is a diagram of an architecture of a custom model platform, according to some embodiments.

FIG. 4 is a block diagram of a custom model platform 108, according to some embodiments. Custom model platform 108 may be communicatively connected to platform model storage 402 that includes platform models 404. As discussed above, platform models 404 may have been generated by model platform 110. Platform model storage 402 may be a memory storage or a collection of memory storages conducive to storing data. Some examples of the memory storages are discussed in detail in FIG. 7. Custom model platform 108 may generate custom models 409 from platform models 404 and model criteria selected using a user interface in FIG. 2.

Custom model platform 108 may receive model criteria including model group and risk profiles 406, sequence of transformations 212, sequence of constraints 214, and configuration input 202 from user interface 201. Model group and risk profiles 406 may include the selected platform model group 204 and the selected risk profiles 206. Sequence of transformations 212 may include transformations 208A-D selected using user interface 201. Sequence of constraints 214 may include constraints 210A-B selected using user interface 201.

Platform models 404 are models that may be associated with or be generated by model platform 110. Platform models 404 may model various platform portfolios. Example platform models 404 are illustrated as platform models 304A-D in FIG. 3. Typically, platforms models 404 may be generated using model platform 110 and be available to multiple users accessing model platform 110. Platform models 404 may include assets, such as funds, ETF, or other combinations of investment vehicles, that may be stocks, bonds, and the like, that are configured in proportions specified in platform models 404.

In some embodiments, custom model platform 108 may associate platform models 404 with platform model groups 410. Each platform model group 410 may include platform models 404 with a similar target. Example targets may include a taxable allocation target, tax-aware allocation target, smart beta allocation target, ESG allocation target, and the like. Some example platform model groups 410 are discussed as model groups 204A-D in FIG. 2. Notably, the above platform model groups 410 are exemplary only, and there may be other platform model groups 410.

In some embodiments, platform models 404 may be associated with risk profiles 412. There may be one risk profile for one platform model in platform models 404. The risk profile 412 may represent a risk of exposure associated with the corresponding platform model 404. The risk profile 412 may vary with the assets and the percentage of assets that are included in platform model 404. Risk profiles 412 for platform model groups 410 may correspond to model groups 204A-D and risk profiles 206 shown in FIG. 2. Risk profiles 412 may be associated with a high risk-low risk level pairs. In some embodiments, platform models 404 in each platform model group 410 may be ranked according to the corresponding risk profile 412. The ranking may be from the highest risk to the lowest risk or vice versa.

In some embodiments, custom model platform 108 may include a model profiler 414, a model transformation module 416, a model constraint module 418, and a model compliance module 420. Model profiler 414, model transformation module 416, model constraint module 418, and model compliance module 420 may be implemented using software, hardware or a combination thereof.

Model profiler 414 may generate a risk profile 212A that corresponds to risk 202B included in configuration input 202. For example, suppose the risk 202B is set to twenty-three-seventy-seven risk level pair and risk profiles 412 associated with model group 410 includes risk profile that is set to twenty-eighty risk level pair and the next risk profile that is set to thirty-seventy risk level pair. Model profiler 414 may receive risk profiles 412 associated with the twenty-eighty risk level pair and the thirty-seventy risk level pair, and interpolate the asset allocations in the received risk profiles 412 to generate risk profile 412A that corresponds to the twenty-three-seventy-seven risk level pair specified by risk 202B. In some embodiments, model profile 414 may generate risk profiles 412 based on the aggressiveness scores of various assets included in platform models 404A and 404B.

Model transformation module 416 may include multiple transformation functions 426. Transformation functions 426 may correspond to transformations 208 that model transformation module 416 may apply to one of platform models 404 to generate one of custom models 409. Transformation functions 426 may also select platform models 404 based on the selected platform model group 204 and selected risk profiles 206 or invoke model profiler 414 when configuration input 202 includes risk 202B that does not match risk profiles 412. The transformation functions 426 may be activated via a configuration file or via the sequence of transformations 212 configured in FIG. 2. For example, transformation function 426A may select one or more platform model groups 410 that correspond to the selected platform model group 204. In another example, transformation function 426B may select platform models 404 within the selected platform model groups 410 with risk profiles 412 that match the selected risk profiles 206. In some instances, when risk profiles 412 do not match risk 202B, transformation function 426B may invoke model profiler 414 to interpolate the platform models 404 based on risk 202B. In other instances, model transformation module 416 may invoke model profiler 414 using the configuration file. In another example, transformation function 426C may lock an asset or a group of assets in platform model 404 using assets or groups of assets specified in transformation 208A. The locked assets or a group of assets may not be substituted with another asset or another group of assets. In another example, transformation function 426D may substitute a group of assets with another group of assets as specified in transformation 208B. In another example, transformation function 426E may substitute an asset in platform model 404 with another asset as specified in transformation 208C. In another example, transformation function 426F may round the shares of assets in custom model 409 to a nearest integer or a percentage as specified in transformation 208D. In another example, transformation function 426G may fix a percentage or set a maximum percentage of the one or more assets that may be allocated to custom model 409 as specified in transformation 208E. In another example, transformation function 426H may fix the maximum percentage of certain types of assets that may be allocated to one of custom models 409 as specified in transformation 208F.

Transformation functions 426A and 426B may receive respective model group and risk profiles 406 as input and provide the selected platform models 404 as output. The selected platform models 404 include asset allocations which are then transformed using one or more transformation functions 426C-H. Transformation functions 426C-H may receive the selected platform models 404 as input, perform the corresponding transformation, and output the transformed platform models 404. Model transformation module 416 may apply transformation functions 426 that are specified by transformations 208 included in the sequence of transformations 212. The output of the last transformation function 426 in sequence of transformations 212 may be custom model 409. Notably, the above transformation functions 426 are exemplary and other transformation functions may be added to model transformation module 416. Additionally, existing transformation functions 426 may be updated or removed from the model transformation module 416.

In some embodiments, transformation functions 426 may be designed using a software language such as Python, or an object-oriented language, such as Java or C++, among others. For example, each one of transformations 426 may be an object written in code in Java or C++ that may be invoked using an object that corresponds to the model transformation module 416.

Model constraint module 418 may apply constraints 210 to custom models 409. The constraints 210 may be specified in a configuration file or may be included in the sequence of constraints 214. Constraints 210 may be mapped to constraint functions 428, such as constraints 210A-G may be mapped to constraint functions 428A-G. For example, constraint function 428A may constrain custom model 409 to be an active portfolio that focuses on outperforming the market. Factor constraint function 428B may constrain custom model 409 to use factors, such as stocks, bonds, securities, etc., that are known to have high returns or other preferred characteristics. Index constraint function 428C may constrain custom model 409 to track a performance of an index. An alternatives constraint function 428D may constrain custom portfolio 409 to include a predefined percentage of alternative investments. The rounding constraint function 428E may round the assets in custom model 409 to the nearest whole share, constraint function 428F may set a minimum trade size for assets in custom model 409, constraint function 428G may set a minimum amount of cash that may be stored in a custom portfolio associated with custom model 409, and constraint function 428H may set a minimum percentage of an asset to be included in the custom portfolio generated by the custom model 409.

Existing constraint functions 428 may be updated or removed from the model constraint module 418. In some embodiments, constraint functions 428 may be designed using a software language such as Python, or an object-oriented language, such as Java or C++, among others. For example, each one of constraints 428 may be an object written in code in Java or C++ that may be invoked using an object that corresponds to the model constraint module 418.

Like transformation functions 426, model constraint module 418 may apply one or more constraint functions 428 based on constraints 210 included in the sequence of constraints 214. Each constraint function 428 may receive custom model 409 as input, add constraints to custom model 409 that are specified in corresponding constraint 210, and output an updated custom model 409. The output of the constraint function 428 may be an input to the subsequent constraint function that is specified by constraints 210 in the constraint sequence 214.

Model compliance module 420 may receive custom model 409 and may verify one or more compliance criteria on the custom model 409. A compliance check may verify whether the custom models 409 include assets and asset allocations that correspond to the risk profiles selected using risk profiles 206 or risk 202B, whether the assets in custom models 409 correspond to the selections in transformations 208A, 208B, etc. Notably, the model compliance module 420 may be configured with various compliance criteria using a configuration file. Once model compliance module 420 completes applying the compliance criteria to custom models 409, the custom models 409 may be displayed using the user interface shown in FIG. 3.

To generate custom models 409, custom model platform 108 may receive the model criteria that includes configuration input 202, model groups and risk profiles 406, sequence of transformations 212 and sequence of constraints 214. The selections may be received as a vector or another data structure that includes values such as alpha-numeric selections for the model criteria that were selected using user interface 201 of FIG. 2 and zero or null values for the model criteria that were not selected. Model transformation module 416 may use model groups and risk profiles 406 and/or risk 202B in configuration input 202 to select platform models 404 using transformation functions 426A-B and/or model profiler 414. Next, model transformation module 416 may apply transformation functions 426C-H that are selected by the sequence of transformations 212 to the selected platform models 404. For example, if the sequence of transformations includes transformations 208A-D, model transformation module 416 may invoke corresponding transformation functions 426C-F to apply data configured in transformations 208A-D. As model transformation module 416 invokes different transformation functions 426, model transformation module 416 generates custom model 409. Next, model constraint module 418 may receive the custom models 409 and apply constraint functions 428 that may correspond to constraints 210 in the sequence of constraints 214. For example, if the sequence of constraints includes constraints 210A-B, model constraint module 418 may invoke constraint functions 428A-B. Next, model compliance module 420 may receive the custom models 409 and determine whether custom models 409 comply the preconfigured compliance criteria.

In some embodiments, custom model platform 108 may generate multiple custom models 409. The number of custom models 409 may be based on the model criteria selections in model group and risk profiles 406 and configuration input 202. To generate each custom model 409, custom model platform 108 may retrieve a corresponding platform model 404, apply transformation functions 426 selected in the sequence of transformation 212 to each platform model 404 to generate custom model 409, apply constraint functions 428 in sequence of constraints 214 to custom model 409, and perform a compliance check on each custom model 409. Custom model platform 108 may then display the custom models 409 and the corresponding platform models 404 using the user interface discussed in FIG. 3.

Figure 5:
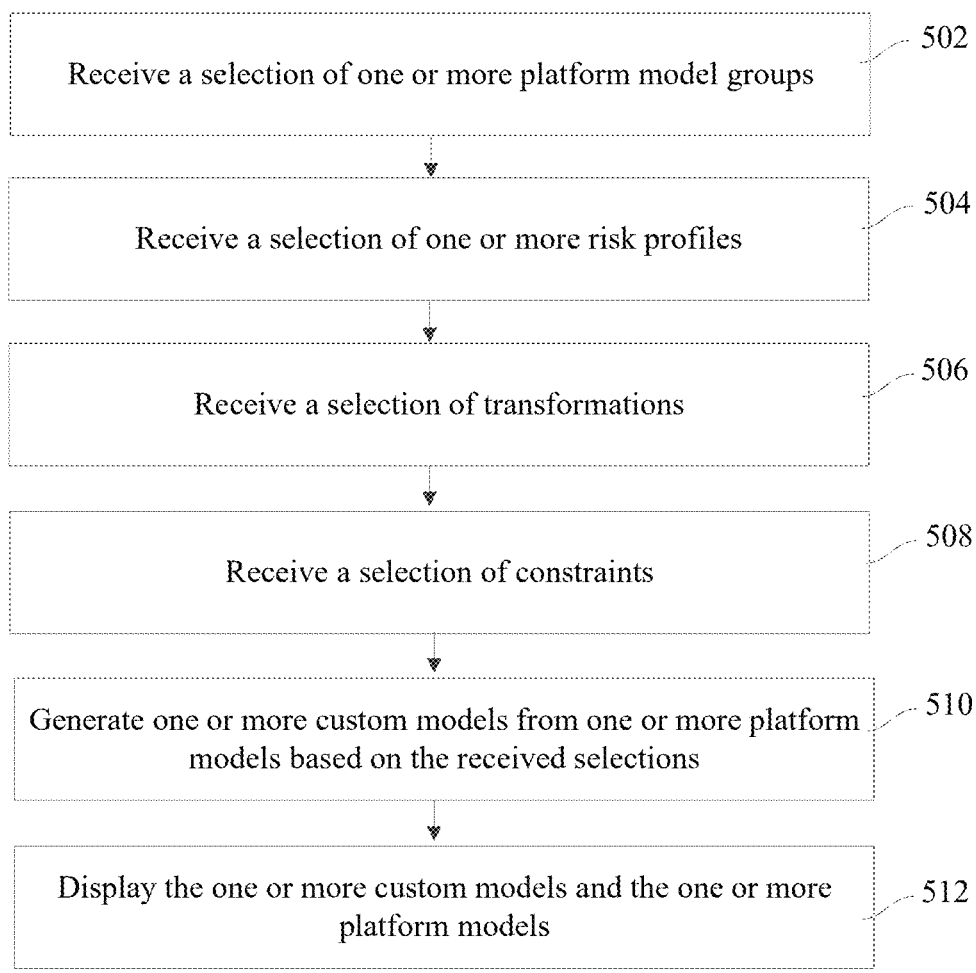
FIGS. 5 and 6 are simplified diagram of methods for generating custom models, according to some embodiments.

FIG. 5 is a simplified diagram of a method 500 for generating custom models, according to some embodiments. One or more of the processes 502-512 of method 500 may be implemented, at least in part, in the form of executable code stored on a non-transitory, tangible, machine-readable media that when run by one or more processors may cause the one or more processors to perform one or more of the processes 502-512.

At process 502, a selection of a platform model group is received. For example, user interface 201 of custom model platform 108 may receive selections of the platform model group 204. As discussed above, the example selections may be received using platform model group 204 displayed in the user interface 201. Custom model platform 108 may receive the selected platform model group as part of model group and risk profiles 406.

At process 504, a selection of risk profiles is received. For example, user interface 201 of custom model platform 108 may receive selections of the risk profiles 206. As discussed above, the example selections may be received using risk profiles 206 displayed on user interface 201. Custom model platform 108 may receive the selected risk profiles 206 as part of model group and risk profiles 406. In some instances, the risk profile may be generated based on risk 202B received in configuration input 202.

At process 506, a selection of transformations is received. For example, user interface 201 of custom model platform 108 may receive selections of one or more the transformations 208 using new transformation selector 209 and receive configurations for the selected transformations 208. Custom model platform 108 may receive the selected transformations 208 in the sequence of transformations 212.

At process 508, a selection of the constraints is received. For example, user interface 201 of custom model platform 108 may receive selections of the one or more constraints 210 using new constraint selector 211 and receive configurations for the selected constraints 210. Custom model platform 108 may receive the selected constraints 210 in the sequence of constraints 214.

Figure 6:
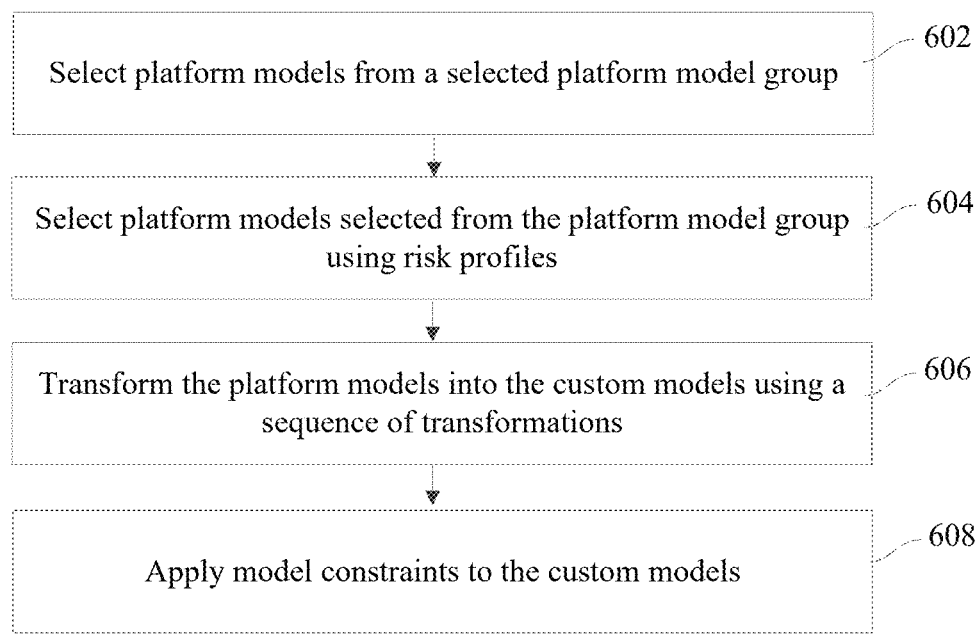

At process 510, custom models are generated. For example, custom model platform 108 may generate one or more custom models 409 based on the model criteria selected by the selections received in processes 502-508. FIG. 6, below, describes in detail how custom models 409 are generated.

At process 512, custom models and platform models are displayed. For example, custom model platform 108 may display custom models 409 and corresponding platform models 404. For example, user interface 302 of FIG. 3 may display platform models 304A-D, custom models 306A-D that are based on platform models 304A-D, as well as the assets 307, such as funds, ETFs, etc., and the percentage of the assets 304 in platform models 304A-D and custom models 306A-D.

FIG. 6 is a simplified diagram of a method 600 for generating custom models, according to some embodiments. One or more of the processes 602-608 of method 600 may be implemented, at least in part, in the form of executable code stored on a non-transitory, tangible, machine-readable media that when run by one or more processors may cause the one or more processors to perform one or more of the processes 602-608. Method 600 may generate one or more custom models 409 for each platform model 404 using one or more transformation functions 426 and constraint functions 428. Further the number of the custom models 409 may depend on the selection of the platform model groups and risk profiles discussed above.

At process 602, platform models in a platform model group are selected. For example, model transformation module 426 may retrieve platform models 404 from platform model group 410 that corresponds to the selection in process 502.

At process 604, platform models associated with the selected risk profiles are selected. For example, model transformation module 426 may select platform models 404 selected in process 602 that are associated with the risk profiles 412 that correspond to risk profiles 206 selected in process 504. In some instances, during or prior to process 604, the risk profile 412A and corresponding platform model 404 may be generated using model profiler 414 based on risk 202B in the configuration input 202.

At process 606, transformations in the sequence of transformations are applied. For example, model transformation model 416 may apply transformations 426 that map to transformations 208 in the sequence of transformations 212 to platform models 404. The transformations 426 may be applied sequentially. The output of the last transformation 426 in the sequence of transformations 212 are custom models 409.

At process 608, the custom models are constrained. For example, model constraint module 418 may apply constraints functions 428 that map to the sequence of constraints 214 to custom models 409 generated in process 606.

At the completion of process 608, custom model platform 108 has generated custom models 409. As discussed above, method 600 may repeat multiple times to generate custom models 409 that correspond to model criteria selected using user interface 201.

Figure 7:
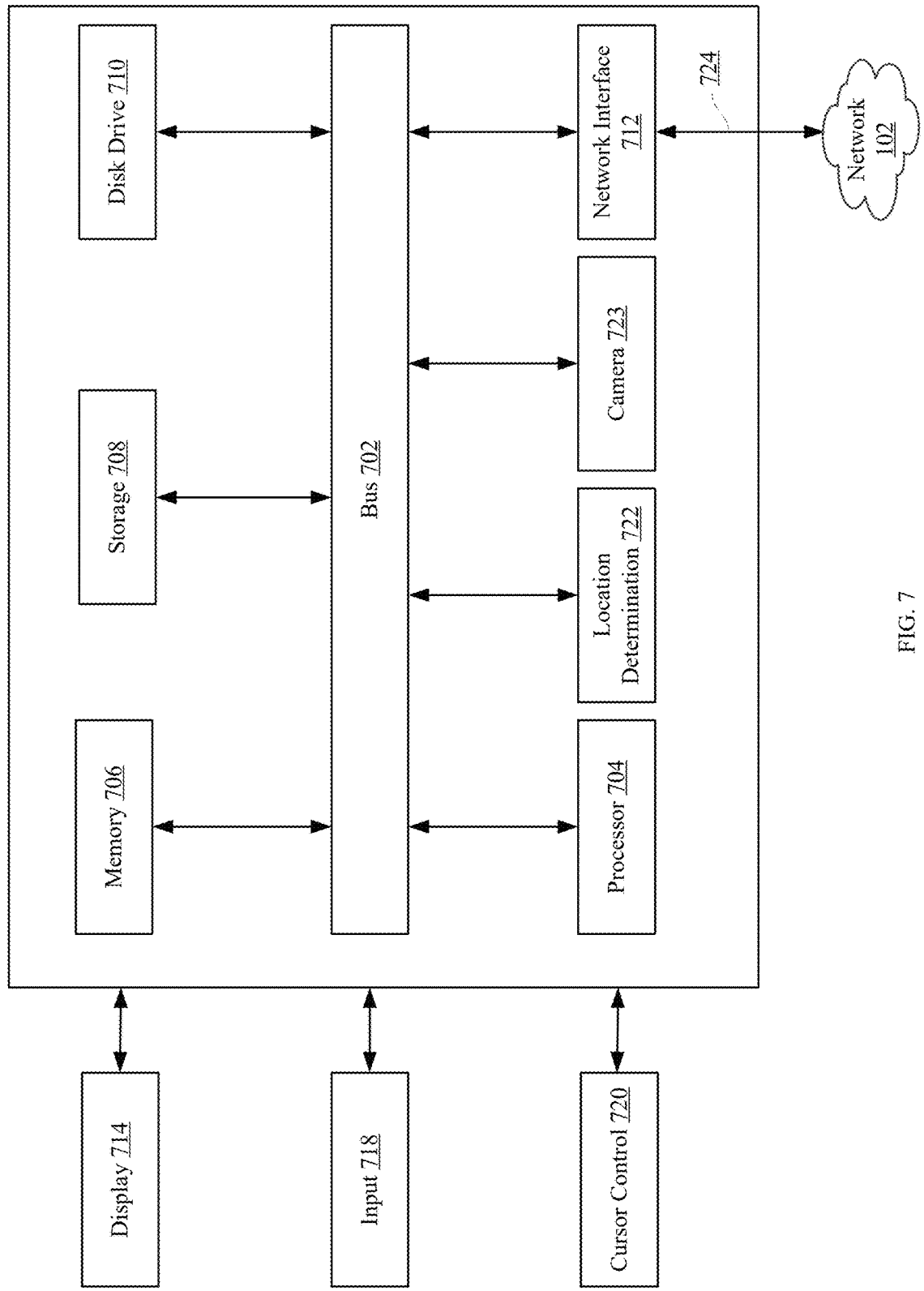
FIG. 7 is an embodiment of a computer system suitable for implementing, the systems and methods described in FIGS. 1-6.

Referring now to FIG. 7 an embodiment of a computer system 700 suitable for implementing, the systems and methods described in FIGS. 1-6 is illustrated.

In accordance with various embodiments of the disclosure, computer system 700, such as a computer and/or a server, includes a bus 702 or other communication mechanism for communicating information, which interconnects subsystems and components, such as a processing component 704 (e.g., processor, micro-controller, digital signal processor (DSP), graphics processing unit (GPU), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the disclosure, the computer system 700 performs specific operations by the processing component 704 executing one or more sequences of instructions contained in the memory component 706, such as described herein with respect to the mobile communications devices, mobile devices, and/or servers. Such instructions may be read into the system memory component 706 from another computer readable medium, such as the static storage component 708 or the disk drive component 710. In other embodiments, hard-wired circuitry may be used in place of or in combination with software instructions to implement the disclosure.

Logic may be encoded in a computer readable medium, which may refer to any medium that participates in providing instructions to the processing component 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 700. In various other embodiments of the disclosure, a plurality of the computer systems 700 coupled by a communication link 724 to the network (e.g., such as a LAN, WLAN, PTSN, and/or various other wired or wireless networks, including telecommunications, mobile, and cellular phone networks) may perform instruction sequences to practice the disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising: a memory configured to store a custom model platform; and a processor coupled to the memory and configured to cause the custom model platform to perform operations comprising:
    integrating the custom model platform as a plug-in into a model platform, wherein the custom model platform generates a custom model, the custom model comprising custom data unavailable in the model platform when generating platform models, and the custom data comprising data received from a user;
    receiving, from a user interface of the custom model platform, a selection of at least one platform model group comprising a plurality of platform models in a first data structure, wherein the plurality of platform models are associated with the model platform;
    receiving, from the user interface, a selection of at least one risk profile from a plurality of risk profiles associated with the at least one platform model group in a second data structure;
    receiving, from the user interface, a selection of custom transformations associated with the custom model platform, wherein the selected custom transformations modify asset allocations in the plurality of platform models in a third data structure;
    receiving, from the user interface, a selection of constraints in a fourth data structure;
    retrieving, from a memory storage, at least one platform model from the plurality of platform models based on the selection of the at least one platform model group in the first data structure and the selection of the at least one risk profile in the second data structure;
    applying the selected custom transformations in the third data structure to assets in the at least one platform model to generate at least one custom model having custom assets, wherein the custom assets comprise the assets of the at least one platform model modified according to the asset allocations in the selected custom transformations;
    applying the selected constraints in the fourth data structure to the custom assets in the at least one custom model; and
    generating in the user interface a display comparing the assets of the retrieved at least one platform model to the custom assets in the at least one custom model.

2. The system of claim 1, wherein the at least one custom model includes at least one asset from the at least one platform model and at least one asset associated with a custom transformation in the selection of custom transformations.

3. The system of claim 1, wherein the at least one platform model group corresponds to the plurality of risk profiles, each risk profile corresponding to one platform model in the plurality of platform models.

4. The system of claim 1, further comprising:
    receiving, using the user interface, a risk parameter for the at least one custom model; and
    generating a risk profile associated with the risk parameter for the at least one custom model by interpolating asset allocations corresponding to a first risk profile that is higher than the risk parameter and a second risk profile that is lower than the risk parameter.

5. The system of claim 1, further comprising:
    configuring a custom transformation in the custom model platform to substitute an asset in the at least one platform model with another asset.

6. The system of claim 1, further comprising:
    configuring a custom transformation to substitute a group of assets in the at least one platform model with another group of assets.

7. The system of claim 1, further comprising:
    configuring a custom transformation in the custom model platform to maximize allocation of an asset in the custom model.

8. The system of claim 1, further comprising:
    configuring the selection of custom transformations as a sequence of transformations to transform the at least one platform model into the at least one custom model.

9. The system of claim 8, wherein an output of a custom transformation in the sequence of transformations is an input to a subsequent transformation in the sequence of transformations.

10. A method, comprising:
    integrating a custom model platform as a plug-in into a model platform, wherein the custom model platform generates a custom model, the custom model comprising custom data unavailable in the model platform when generating platform models, and the custom data comprising data received from a user;
    receiving, at a user interface of the custom model platform executing on a processor, a selection of at least one platform model group comprising a plurality of platform models;
    receiving, at the user interface, a selection of at least one risk profile from a plurality of risk profiles associated with the at least one platform model group;
    receiving, at the user interface, a selection of a sequence of custom transformations associated with the custom model platform, a custom transformation in the sequence of custom transformations including an asset, wherein the selected custom transformations modify asset allocations in the plurality of platform models;
receiving a selection of constraints;
retrieving a platform model based on the selection of the at least one platform model group and the at least one risk profile, the platform model including a plurality of assets;
accessing a configuration file of the custom model platform storing custom transformation functions;
activating, using the processor and the configuration file, the custom transformation functions corresponding to the sequence of custom transformations, wherein the custom transformation functions modify an asset allocation of the assets in the platform model to generate the custom model having custom assets, wherein the custom assets comprise the assets of the platform model modified according to the asset allocations in the selected custom transformations, and wherein the custom transformation substitutes at least one asset in the plurality of assets of the platform model with the asset included in the custom transformation;
applying the selected constraints to the custom assets in the custom model; and
generating a second user interface comparing the assets of the platform model to the custom assets in the custom model.

11. The method of claim 10, further comprising:
receiving a selection of a platform model group in a plurality of platform model groups, wherein the platform model group includes a plurality of platform models and the plurality of platform models are associated with the plurality of risk profiles; and
retrieving the platform model associated with the at least one risk profile from the plurality of risk profiles.

12. The method of claim 10, wherein a second custom transformation in the sequence of custom transformations substitutes a group of assets with a second group of assets; and
configuring the second custom transformation to substitute the group of assets with the second group of assets.

13. The method of claim 10, further comprising:
interpolating risk profiles of at least two platform models to generate a risk profile for the custom model.

14. The method of claim 13, further comprising:
selecting a first risk profile associated with a first platform model in the at least two platform models with a risk higher than a risk parameter associated with the custom model; and
selecting a second risk profile associated with a second platform model in the at least two platform models with a risk lower than the risk parameter associated with the custom model.

15. The method of claim 10, further comprising:
configuring the custom transformation in the sequence of custom transformations with the asset that substitutes an asset in the plurality of assets of the platform model.

16. The method of claim 10, wherein the sequence of custom transformations changes allocations of the plurality of assets in the platform model to incorporate the asset in the custom transformation into the custom model.

17. The method of claim 10, wherein an output of the custom transformation in the sequence of custom transformations is an input to a subsequent transformation in the sequence of transformations.

18. The method of claim 10, further comprising:
configuring constraints in a sequence of constraints associated with the custom model; and
applying the sequence of constraints to the custom model after the sequence of custom transformations generated the custom model from the platform model.

19. A non-transitory computer readable medium having instructions stored thereon, that when executed by a processor cause the processor to perform operations, the operations comprising:
integrating a custom model platform as a plug-in into a model platform, wherein the custom model platform generates a custom model, the custom model comprising custom data unavailable in the model platform when generating platform models, and the custom data comprising data received from a user;
receiving, using a user interface of the custom model platform, a selection of a platform model group comprising a plurality of platform models in the model platform;
receiving, using the user interface, a selection of at least one risk profile from a plurality of risk profiles associated with the platform model group;
receiving, using the user interface, a sequence of custom transformations, wherein custom transformations in the sequence of custom transformations modify asset allocations to transform a platform model into the custom model;
receiving, using the user interface, a selection of constraints;
retrieving the platform model in the model platform based on the selection of the at least one platform model group and the at least one risk profile from a plurality of platform models associated with the platform model group;
applying the sequence of custom transformations to the assets in the platform model to generate the custom model having custom assets, wherein the custom assets comprise the assets of the platform model modified according to the asset allocations in the selected transformations, and wherein the applying further comprises invoking custom transformation functions stored in memory corresponding to the sequence of custom transformations; and
generating an interface comparing the assets of the platform model to the custom assets in the custom model.

20. The non-transitory computer readable medium of claim 19, further comprising:
configuring constraints in a sequence of constraints;
receiving, using the user interface, the sequence of constraints; and
applying the sequence of constraints to the custom model.

* * * * *

UNITED STATES PATENT AND TRADEMARK OFFICE
CERTIFICATE OF CORRECTION

| | | |
|---|---|---|
| PATENT NO. | : 12,487,738 B1 | Page 1 of 1 |
| APPLICATION NO. | : 18/299336 | |
| DATED | : December 2, 2025 | |
| INVENTOR(S) | : Hardisty et al. | |

It is certified that error appears in the above-identified patent and that said Letters Patent is hereby corrected as shown below:

In the Claims

At Column 18, Line 37, "on the selection of the at least one platform model group" should read "on the selection of the platform model group"

Signed and Sealed this
Third Day of February, 2026

John A. Squires
*Director of the United States Patent and Trademark Office*